United States Patent [19]

Sutterlin et al.

[11] Patent Number: 4,713,434
[45] Date of Patent: Dec. 15, 1987

[54] CONTINUOUS EMULSION POLYMERIZATION PROCESS

[75] Inventors: Norbert Sutterlin, Ramstadt; Hans-Dieter Blitz, Jugenheim; Theodor Mager, Darmstadt; Karl-Heinz Jagsch, Gross-Gerau; Dieter Tessmer, Russelsheim, all of Fed. Rep. of Germany

[73] Assignee: Röhm GmbH Chemische Fabrik, Darmstadt, Fed. Rep. of Germany

[21] Appl. No.: 503,171

[22] Filed: Jun. 10, 1983

[30] Foreign Application Priority Data

Jun. 11, 1982 [DE] Fed. Rep. of Germany ....... 3222002

[51] Int. Cl.$^4$ .............................................. C08F 2/00
[52] U.S. Cl. ......................................... 526/62; 526/64
[58] Field of Search ................................... 526/62, 64

[56] References Cited

U.S. PATENT DOCUMENTS 4,256,864  3/1981  Cohen ................................. 526/62
4,331,787  5/1982  Fairchok et al. ..................... 526/62

FOREIGN PATENT DOCUMENTS 400  7/1977  European Pat. Off. .
430  1/1979  European Pat. Off. .

OTHER PUBLICATIONS

Chemical Abstract 95:63152 (Abstracting German 05 29 46 461.
Chemical Abstracts 91:75117 (Abstracting Brit. Pat. 1,534,245).
Chemical Abstracts 81:176139 (Abstracting Japanese Appln 79-73888).

Primary Examiner—Paul R. Michl
Assistant Examiner—Alex H. Walker
Attorney, Agent, or Firm—Oblon, Fisher, Spivak, McClelland, & Maier

[57] ABSTRACT

A process for the continuous preparation of aqueous plastic dispersions which comprises emulsifying one or more free-radically polymerizable monomers in an aqueous phase in the presence of an emulsifying agent, in an agitator vessel; initiating the free-radical polymerization of said monomer or monomers in said aqueous phase; and passing said aqueous emulsion of the free-radically polymerizing monomer or monomers through a tubular reactor whose internal surface comprises an (optionally fluorinated)saturated polyolefin.

20 Claims, No Drawings

CONTINUOUS EMULSION POLYMERIZATION PROCESS

BACKGROUND OF THE INVENTION

1. Field of the Invention

The invention relates to a process for the continuous preparation of aqueous synthetic resin dispersions in a tubular reactor.

2. Description of the Prior Art

There are numerous processes for continuous emulsion polymerization. They are carried out mostly in agitator vessels subject to continuous flow, which—as in the batch process—are normally made of steel and are sometimes lined with enamel. Tubular reactors for continuous emulsion polymerization have also been described. They provide a shorter retention time and thus a narrower particle size distribution and allow greater heat dissipation due to the more favorable surface-to-volume ratio.

FR No. 842 829 (1938) describes a continuous emulsion polymerization in a coiled tube measuring 60 m in length and 25 mm in diameter. Steel and glass are suggested as materials for this tube. In FR No. 847 151 the material making up the tube for a similar polymerization apparatus is not mentioned at all. M. Gosh and T. H. Forsyth (ACS Symposium Series 24 "Emulsion Polymerization") used a coiled tube made of steel measuring 73 m in length and 1.27 cm in diameter in scientific experiments on the continuous emulsion polymerization of styrene.

These simple tubular reactors have not found industrial applications because the danger of obstructions due to attachments to the tube wall must always be considered. As the location of an obstruction in a steel tube cannot be determined from the outside, and the obstruction is difficult to remove, the entire tubular reactor often fails due to a small obstruction.

There has been no lack of efforts to eliminate obstructions in continuous emulsion polymerization in tubular reactors through the installation of mixers and the like. In FR No. 843 845 such a tubular reactor measuring 3.4 m in length and 12 cm in diameter with a mixer passing through the length of the reactor was described. However, the material making up the tube and mixer is not mentioned. A similar tubular reactor, enameled on the inside, is described in DE No. 880 938. In the tubular reactor according to DE No. 1 137 216, in addition to the mixer, a movable scraper is provided along the longitudinal axis of the tube, which removes attachments from the mixer and tube wall. Here, too, the material is not mentioned.

Therefore, a need continues to exist for a process whereby continuous emulsion polymerizations may be conducted in a tubular reactor with minimal risk of obstruction. Such obstructions continue to plague industry with large losses in plant investments.

SUMMARY OF THE INVENTION

Accordingly, it is an object of this invention to provide a process whereby continuous emulsion polymerizations may be conducted in a tubular reactor with minimal risk of obstruction.

It is also an object of the present invention to provide a tubular reactor to be used in conjunction with the aforesaid process.

According to the present invention, the foregoing and other objects are attained by providing a process for the continuous preparation of aqueous synthetic resin dispersions which comprises: emulsifying one or more free-radically polymerizable monomers in an aqueous phase in the presence of an emulsifying agent, in an agitator vessel; initiating the free-radical polymerization of said monomer or monomers by the addition of a free-radical initiator compound to said aqueous phase emulsion; and passing said emulsion through a tubular reactor whose internal surface comprises a saturated polyolefin or a fluorinated saturated polyolefin compound.

DESCRIPTION OF THE PREFERRED EMBODIMENTS

According to the invention, a process is provided by which during the free-radical polymerization of an aqueous monomer emulsion, the aqueous monomer emulsion is fed through a tubular reactor whose inner surface comprises a saturated polyolefin or a fluorinated saturated polyolefin.

It is indeed surprising how little attention has been paid to the selection of the material used in making the tube. The materials used in the reactor according to the invention are characterized by extremely low adhesion to the forming polymer. Therefore, when polymerization is carried out expertly there is little or no wall coating, even after long periods of operation. Any deposits can be loosened and washed out with water more easily than with any other material. Even a tightly adhering coagulate plug can usually be loosened and forced out under the pressure of water or other liquids. Using the preferred design, in which a tube made of inexpensive extruded material is used, the work and time needed to force out a plug is usually not worthwhile. The cost of material for an extruded plastic plug is so low as to be insignificant when compared with other plant and operational costs. As soon as interfering deposits or obstructions arise, the entire tubular reactor can be replaced at minimal cost.

The Tubular Reactor

The tubular reactor consists of a saturated polyolefin or a saturated fluorinated polyolefin, at least on the inner wall. Preferred materials are polyethylene, polypropylene, and polytetrafluoroethylene. They can be applied in a thin layer on the inner walls of metal tubes; this is the case especially with the last-mentioned material. A layer measuring a few micrometers in thickness is sufficient.

Preferably, the tubular reactor consists throughout of the above materials. Tubes made of polypropylene are rather stiff and can be joined together with plug connectors. Tubes made of polyethylene are much more flexible and can be positioned and coiled almost at will. Owing to their low cost and the ease in laying them out, polyethylene tubes are the preferred material for tubular reactors. They can be reinforced with cloth or wire inserts or wrappings, especially when the reaction mixture is under pressure.

For industrial production lines, tubes or flexible tubes measuring about 1–15 cm, preferably 2–4 cm, in internal diameter are used. In zones of limited polymerization activity, and thus of limited heat development, thicker tubes can be used than in zones of high polymerization activity. In some cases several tubes or flexible tubes are operated in parallel. At the inputs and outputs, where the tubular reactor is connected with other system components, it is useful to attach connector adapters with shutoff devices for one or several other tubular reactors, so that if it is necesary to replace a tube, the flow of material can be rerouted to another tubular reactor without interruption of the continuous process. The length of the tubular reactor is determined by the required retention period and rate of flow. For example, it can measure 10–200 m in length, although in special cases even longer reactors can be used. Hourly throughput rates of 10 to 40 times the volume of the reactor can be achieved.

In continuous emulsion polymerization tubular reactors have an advantage over agitator vessels in that a narrower particle size distribution can be achieved. This advantage can be had even when the entire polymerization is not carried out in a tubular reactor. For example, a seed latex can be produced continuously in an agitator vessel and then be added with other monomers to the tubular reactor. In that case, there is a broader particle size distribution than is the case when the seed latex is fabricated continuously in a tubular reactor or a discontinuously prefabricated seed latex is injected continuously. Several tubular reactors connected in series, cooling them at the places where they are connected or injecting a fresh monomer emulsion can also be used.

The tubular reactor can be heated or cooled externaly to maintain the desired polymerization temperature. A tube jacket can be used for this purpose. It is simpler to place the tubular reactor in a container with a circulating coolant. Generally water is used for heating or cooling. In an adiabatic method of operation, the reactor can be surrounded by air.

Process of Emulsion Polymerization

The monomers to be polymerized are first placed in a separate agitator vessel, preferably one subject to continuous flow, and emulsified in a water phase containing an emulsifying agent. As a rule the polymerization initiator is added as the same time. Water-soluble redox initiators are preferred. If desired the polymerization can be started in an agitator vessel connected at the outlet. The emsulion is then fed into the tubular reactor, preferably with a pump.

In general, the heat of polymerization can easily be dissipated up to a monomer content of about 40% by weight, relative to emsulion weight. When dispersions having a solids content of over 40% by weight are to be produced, it is recommended that no more than about 40% monomer emulsion be polymerized in a first tubular reactor until substantial reaction of the monomers, and that subsequently added monomers be emulsified. This can occur in a small emulsifying vessel, subject to continuous flow with a short retention period; preferably, however, only part of the reaction is carried out in such an intermediate vessel. The mixing of the added monomers with the polymerizing reaction mixture can be promoted if the monomers, or the monomer emulsion, are injected into the reaction mixture at high speed through a small nozzle. The resulting emulsion can be polymerized further in another tubular reactor or in an agitator vessel. In the latter case, the particle size distribution is broader. The emulsifying and further polymerization can also be carried out in the same agitator vessel. In producing dispersions having a solids content of 60% or more, three or more polymerization stages can be connected in series in the indicated manner. All told, at least 30% by weight of the reacted monomers should be polymerized in one or several tubular reactors.

According to the process in the invention, practically all monomers from which aqueous polymer dispersions can be produced can be polymerized. The most important monomers are the esters of acrylic acid and methacrylic acid, styrene, vinyl ester, vinyl chloride, ethylene, propylene, butadiene, and their compounds, individually or mixtures thereof. Preferably monomers or monomer compounds are processed that boil at normal pressure above the temperature of polymerization, especially acryl and methacrylalkyl esters (with 1 to 14 carbon atoms in the alcohol radical), styrene, and vinyl acetate as principle monomers. Acrylic acid and methacrylic acid, their amides, methylol amides, nitriles, aminoalkyl esters or hydroxylalkyl esters, and vinylidene chloride can be considered as modifying comonomers which generally are used in quantities up to about 30% by weight (relative to total monomer weight). Temperature and pressure are regulated in such a way that no air bubbles develop in the reaction mixture. The polymerization conditions with respect to the initiators and emulsifiers and other agents, as well as to temperature and retention period, are not different from other, known continuous emulsion polymerization processes. It is advantageous to have a low starting temperature, in the range of 20° to 40° C., so that the temperature during a retention period of, say, 3 to 10 minutes can be allowed to rise more or less adiabatically to a maximum of 80° to 90° C.

The greater the amount of the reaction that is carried out in a tubular reactor, the more similar is the resulting dispersion to a dispersion produced by batch in an agitator vessel under corresponding process conditions. The mean particle size (mean weight) is generally between 40 and 500 nm.

The present invention will be further illustrated by certain examples and references which are provided for purposes of illustration only and are not intended to limit the present invention.

EXAMPLE 1

A 70-meter-long polyethylene flexible tube measuring 6 mm in diameter with a wall thickness of 1 mm was placed in a water bath over the first half of its length and brought to a temperature of 30° C., while the second half of the tube was placed in an air bath. Through this tube was sent an emulsion consisting of
  2300 g ethyl acrylate
  208.3 g methylol methacrylamide, 60% aqueous solution
  75 g methyl methacrylate
  5 g ammonium persulfate
  0.05 g iron sulfate
  50 g anionic emulsifier (triisobutylphenol, reacted with 7 moles ethylene oxide, sulfated, Na salt, 50% aqueous solution)
  3000 g water
and shortly before entry into the tube, a solution was injected consisting of
  10 g sodium bisulfite
  2000 g water
in the ratio of 2.8:1 emulsion to bisulfite solution. The throughput rate of the polymerizing system was 7.65 kg/h. A coagulate-free, stable dispersion with a 31.8% solids content and a mean particle diameter of 92 nm with narrow particle size distribution was obtained. Reaction at the end of the tube totaled 95.8%.

EXAMPLE 2

The process in Example 1 was followed, except that instead of using the emulsion indicated there, an emulsion was substituted consisting of
- 1150 g ethyl acrylate
- 1225 g methyl methacrylate
- 83.33 g methylol methacrylamide, 60% aqueous solution
- 75 g methacrylamide
- 100 g the above anionic emulsifier solution
- 10 g ammonium persulfate
- 0.05 g iron sulfate
- 3000 g water and shortly before entry into the tube, a solution was injected consisting of
- 2000 g water
- 20 g sodium bisulfite in the ratio of 2.8:1 emulsion to bisulfate solution. The throughput rate of the polymerizing system was 7.66 kg/h. A coagulate-free, stable dispersion with a 32.1% solids content and a mean particle diameter of 76 nm with narrow particle size distribution was obtained.

EXAMPLE 3

The process in Example 1 was followed, except that instead of using the emulsion indicated there, an emulsion was substituted consisting of
- 1775 g butyl acrylate
- 1775 g methyl methacrylate
- 166.67 g methyl methacrylamide, 60% aqueous solution
- 25 g methacrylamide
- 25 g methacrylic acid
- 50 g the above anionic emulsifier solution
- 5 g ammonium persulfate
- 0.05 g iron sulfate
- 3000 g water and shortly before entry into the tube, a solution was injected consisting of
- 2000 g water
- 10 g sodium bisulfite in the ratio of 2.8:1 emulsion to bisulfite solution. The throughput rate of the polymerizing system was 7.63 kg/h. A coagulate-free, stable dispersion with a 31.2% solids content and a mean particle diameter of 74 nm with narrow particle size distribution was obtained.

EXAMPLE 4

The process in Example 1 was followed, except that instead of using the emulsion indicated there, an emulsion was substituted consisting of
- 1250 g butyl acrylate
- 1125 g methyl methacrylate
- 75 g methacrylamide
- 50 g methacrylic acid
- 100 g the above anionic emulsifier solution
- 10 g ammonium persulfate
- 0.05 g iron sulfate
- 3000 g water and shortly before entry into the tube, a solution was injected consisting of
- 2000 g water
- 20 g sodium bisulfite in the ratio of 2.8:1 emulsion to bisulfite solution. The throughput rate of the polymerizing system was 7.63 kg/h. A coagulate-free, stable dispersion with a 32.8% solids content and a mean particle diameter of 68 nm with narrow particle size distribution was obtained.

EXAMPLE 5

The process as in Example 4 was repeated, except that instead of a polyethylene flexible tube, a polypropylene tube measuring 70 meters long and 6 mm in internal diameter with a 1 mm wall was used as the reactor. The result obtained was the same as that in Example 4.

EXAMPLE 6

A 70-meter-long polyethylene flexible tube measuring 6 mm in diameter with a wall thickness of 1 mm was placed in a water bath over the first half of its length and brought to a temperature of 60° C., while the second half of the tube was placed in an air bath. Through this tube was sent an emulsion consisting of
- 1250 g styrene
- 1225 g butyl acrylate
- 25 g methacrylic acid
- 250 g anionic emulsifier solution described in Example 1
- 10 g ammonium persulfate
- 0.05 g iron sulfate
- 3000 g water and shortly before entry into the tube, a solution was injected consisting of
- 2000 g water
- 20 g sodium bisulfite in the ratio of 2.85:1 emulsion to bisulfite solution. The throughput rate of the polymerizing system was 7.78 kg/h. A coagulate-free, stable dispersion with a 30.9% solids content and a mean particle diameter of 60 nm with narrow particle size distribution was obtained.

EXAMPLE 7

A 70-meter-long polyethylene flexible tube measuring 6 mm in diameter with a wall thickness of 1 mm was placed in a water bath over the first half of its length and brought to a temperature of 40° C., while the second half of the tube was placed in an air bath. Through this tube was sent an emulsion consisting of
- 1125 g methyl methacrylate
- 1125 g butyl acrylate
- 250 g vinyl acetate
- 100 g anionic emulsifier solution described in Example 1
- 20 g ammonium persulfate
- 0.1 g iron sulfate
- 3000 g water and shortly before entry into the tube, a solution was injected consisting of
- 2000 g water
- 40 g sodium bisulfite in the ratio of 2.75:1 emulsion to bisulfite solution. The throughput rate of the polymerizing system ws 7.66 kg/h. A coagulate-free, stable dispersion with a 31.6% solids content and a mean particle diameter of 75 nm with narrow particle size distribution was obtained.

EXAMPLE 8

A 25-meter-long polytetrafluoroethylene tube measuring 8 mm in diameter with a wall thickness of 1 mm was placed in a water bath over the first half of its length and brought to a temperature of 30° C., while the second half was placed in an air bath. Through this tube was sent an emulsion consisting of 781.25 g butyl acrylate
703.13 g methyl methacrylate
44.88 g methacrylamide
31.25 g methacrylic acid
62.5 g anionic emulsifier solution described in Example 1
6.25 g ammonium persulfate
0.031 g iron sulfate
1875 g water
and shortly before entry into the tube, a solution was injected consisting of
1250 g water
12.5 g sodium bisulfite
in the ratio of 2.79:1 emulsion to bisulfite solution. The throughput rate of the polymerizing system was 4.77 kg/h. A coagulate-free, stable dispersion with a 32.5% solids content and a mean particle diameter of 70 nm with narrow particle size distribution was obtained.

EXAMPLE 9

The process in Example 8 was followed, except that instead of the polytetrafluoroethylene tube, a 25-meter-long steel tube with a Teflon coating was used. A coagulate-free, stable dispersion with a 32.2% solids content and a mean particle diamter of 70 nm with narrow particle size distribution was obtained.

EXAMPLE 10 (COMPARISON TEST)

The process in Example 8 was followed, with the exception that instead of the polytetrafluoroethylene tube, a 25-meter-long tube made of V4A steel without Teflon coating was used. In contrast to the (fluorinated) polyolefin tubes, or the steel tube coated with polytetrafluoroethylene, a heavy layer built up on the wall and after 1.5 hours led to a blocking of the reactor.

EXAMPLE 11

A multistage polymerization process was carried out, wherein the first stage was polymerized as described in Example 4. At the end of the 70-meter tube, in a stationary mixing container with concentrically arranged supply nozzles, which created good turbulence in the mixing area, a second portion of the monomer mixture was in the first stage was added at the rate of 2.5 kg/h and was polymerized to the end in a further section of a polyethylene tube measuring 35 meters in length and 6 mm in diameter with a wall thickness of 1 mm. The cooling of this section of the tube can be carried out with air as well as with water. Independently of the coolant, a stable dispersion with a solids content of 50.3% was obtained. The mean particle diameter was 112 nm.

EXAMPLE 12

The process is Example 11 was followed, except that instead of the stationary mixing containers, a 100-ml three-necked flask with a blade mixer was used as the mixing vessel for the addition of the second portion of the monomer. A coagulation-free, stable dispersion with a solids content of 49.2% and a mean particle diameter of 100 nm was obtained.

EXAMPLE 13

The process in Example 4 was followed, except that instead of the bisulfite solution, a solution consisting of
2000 g water
20 g sodium hydroxymethylsulfinate
was used. A coagulate-free dispersion with a solids content of 32.0% and a mean particle diameter of 72 nm with narrow particle size distribution was obtained.

EXAMPLE 14

Through the apparatus described in Example 1 an emulsion was sent consisting of
705 g methyl methacrylate
1648.7 g ethyl acrylate
28.6 g methacrylic acid
684.6 g nonionic emulsifier (isononylphenol reacted with 100 moles ethylene oxide, 35% solution)
0.76 g $FeSO_4$, 5% solution
2664.5 g water
7.6 g ammonium persulfate
and shortly before entry into the tube, a solution was injected consisting of
10.53 g sodium bisulfite
1879.5 g water
in the ratio of 3.03:1 emulsion to bisulfite solution. The throughput rate of the polymerizing system was 7.63 kg/h. A coagulate-free, stable dispersion with a solids content of 33% and a mean particle diameter of 70 nm with narrow particle size distribution was obtained.

EXAMPLE 15

A 70-meter-long polyethylene flexible tube measuring 6 mm in diameter with a wall thickness of 1 mm was placed in two water baths, of which the first was 35° C. and the second was held at 20° C. with circulating fresh water. Through this tube an emulsion was sent consisting of
1475 g methyl methacrylate
3448 g ethyl acrylate
59.8 g methacrylic acid
716 g isononylphenol reacted with 100 moles ethylene oxide, 35% solution
19.93 g ammonium persulfate
1 g iron sulfate, 5% aqueous solution
4281 g water
and shortly before entry into the tube, a solution was injected consisting of
47.7 g sodium bisulfite
852 g water
in the ratio of 11:1 emulsion to bisulfite solution. The throughput rate of the polymerizing system was 10.9 kg/h. Following the start of the reaction, the polyethylene tube must be cooled increasingly with water. A coagulate-free, stable dispersion with a solids content of 43.9% and a mean particle diameter of 106 nm with narrow particle size distribution was obtained.

EXAMPLE 16

A 35-meter-long polyethylene flexible tube measuring 6 mm in diameter with a wall thickness of 1 mm was positioned in a water bath in such a way that it could be raised to a temperature of 35° C. Through this tube an emulsion was sent consisting of
2896 g methyl methacrylate
6771 g ethyl acrylate
117.4 g methacrylic acid
39 g ammonium persulfate
2 g iron sulfate, 5% aqueous solution
1757 g emulsifier solution in Example 15
13,419 g water
and shortly before entry into the tube, a solution was injected consisting of
21.4 g sodium bisulfite 478.6 g water At the end of the 35-meter tube, the latex obtained was introduced into a 5-liter agitator vessel, and a second portion of monomers consisting of 1730 g ethyl acrylate
740 g methyl methacrylate
30 g methacrylic acid was added at the rate of 2.5 kg/h. There was about an 80% reaction. The latex was transferred from the agitator vessel into a second agitator vessel, where over 95% reaction occurred. A coagulate-free, stable dispersion with a solids content of 41.8% and a mean particle diameter of 106 nm was obtained.

EXAMPLE 17

The process in Example 16 was followed, except that instead of the supply of monomers, an emulsion consisting of 1730 g ethyl acrylate
740 g methyl methacrylate
30 g methacrylic acid
9.97 g ammonium persulfate
449.4 g emulsifier solution in Example 15
3429 g water was added to the first agitator vessel, where a solids content of 39% was achieved. In a second reactor a final solids content of 41% was achieved.

EXAMPLE 18 (COMPARISON TEST)

A 50-meter-long tube made of polyvinyl chloride with an internal diameter of 1 cam was charged with an emulsion consisting of 1328.64 g ethyl acrylate
568.32 g methacrylic acid
23.04 g methacrylic acid
274.37 g nonionic emulsifier (isononylphenol reacted with 100 moles ethylene oxide, 35% solution)
3.84 g ammonium persulfate
1863.88 g water and shortly before entry into the tube, a solution was injected consisting of 5.4 g sodium bisulfite
0.0192 g iron sulfate
1000 g water in the ratio of 4.04:1 emulsion to bisulfite solution. A heavy coating accumulated on the wall and gradually led to a blocking of the reactor.

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process for the continuous preparation of aqueous synthetic resin dispersions which comprises:
   (a) emulsifying one or more free-radically polymerizable monomers in an aqueous phase in the presence of an emulsifying agent, in an agitator vessel,
   (b) initiating the free radical polymerization of said monomer of monomers in said aqueous phase, and
   (c) passing said aqueous emulsion of the free-radically polymerizing monomer or monomers through at least one tubular reactor whose internal surface comprises a saturated polyolefin or a fluorinated saturated polyolefin.

2. The process of claim 1, wherein said tubular reactor comprises a flexible or non-flexible tube comprising a saturated polyolefin or a fluorinated saturated polyolefin.

3. The process of claim 2, wherein said flexible tube comprises a polyethylene or polypropylene.

4. The process of claim 1, wherein said free-radical polymerization is initiated at a temperature in the range of 20° to 90° C. by means of a water-soluble redox initiator.

5. The process of claim 1, wherein said agitator vessel is subject to continuous flow.

6. The process of claim 1, wherein the passing of said aqueous emulsion of the free-radically polymerizable monomer or monomers through said tubular reactor is effected by a pump.

7. The process of claim 1, wherein at least 30% by weight of the free-radically polymerizable monomer or monomers used to prepare the plastic dispersion is reacted in said tubular reactor.

8. The process of claim 7, which further comprises continuing said free-radical polymerization in a sescond tubular reactor or second agitator vessel, subject to continuous flow, following discharge from the first tubular reactor.

9. The process of claim 1, which further comprises admixing additional amounts of the monomer or monomers in the polymerizing emulsion after discharge from said first tubular reactor and continuing the polymerization.

10. The process of claim 8, which further comprises admixing additional amounts of the monomer or monomers in the polymerizing emulsion in said second tubular reactor or second agitator vessel, subject to continuous flow, following discharge from said first tubular reactor.

11. The process of claim 10, which further comprises admixing additional amounts of the monomer or monomers in the polymerizing emulsion into succeeding tubular reactors or agitator vessels, subject to continuous flow, following discharge from the preceding tubular reactor.

12. The process of claim 11, wherein the polymerizing emulsion of monomer or monomers is directed through three or more polymerization zones comprising the first tubular reactor; a mixing vessel connected at the end of said first tubular reactor, wherein said additional amount of monomer or monomers is admixed with said polymerizing emulsion; and said second tubular reactor connected to said mixing vessel.

13. The process of claim 1, wherein the aqueous emuslion is passed through more than one tubular reactor whose internal surfaces comprise a saturated polyolefin or a fluorinated saturated polyolefin said tubular reactors being subject to parallel flow.

14. The process of claim 13, wherein the polymerizing emulsion is discharged from said reactors into a second agitator vessel, subject to continuous flow, and the free-radical polymerization is continued in said second agitator vessel.

15. The process of claim 14, wherein the polymerization of the monomers in the aqueous emulsion is continued in more than one tubular reactor, subject to continuous flow, following discharge from said second agitator vessel, said tubular reactors being subject to parallel flow.

16. The process of claim 1, wherein said free-radically polymerizable monomer or monomers boil at normal pressure above the temperature of their polymerization.

17. The process of claim 1, wherein said free-radically polymerizable monomer or monomers comprise styrene, vinyl esters, vinyl chloride, ethylene, propylene, butadiene, esters of acrylic acid and esters of methacrylic acid, or a mixture thereof.

18. The process of claim 17, wherein said free-radically polymerizable monomer or monomers comprise acrylic esters and methacrylic esters having 1 to 14 carbon atoms in the alcohol radical, styrene and vinyl acetate, or a mixture thereof.

19. The process of claim 17, wherein said free-radically polymerizable monomer or monomers further comprise acrylic acid, methacrylic acid, or the amides thereof, methylol amides, nitriles, aminoalkyl esters, hydroxyalkyl esters, or vinylidene chloride, or a mixture thereof, in an amount of up to 30%, by weight based on total monomer weight, as modifying comonomers.

20. An aqueous plastic dispersion having a mean particle size in the range of 40 to 500 nm produced in a continuous process which comprises the steps of:
  (a) emulsifying one or more free-radically polymerizable monomers in an aqueous phase in the presence of an emulsifying agent, in an agitator vessel,
  (b) initiating the free radical polymerization of said monomer or monomers in said aqueous phase, and,
  (c) passing said aqueous emulsion of the free-radically polymerizing monomer or monomers through a tubular reactor whose internal surface comprises a saturated polyolefin or a fluorinated saturated polyolefin.

* * * * *